United States Patent [19]

Morita et al.

[11] Patent Number: 4,814,742

[45] Date of Patent: Mar. 21, 1989

[54] INQUIRY SYSTEM FOR DETECTING A SELECTED OBJECT

[75] Inventors: Shizuo Morita, Ikoma; Kiyoshi Tada, Tokyo; Tatsuo Togo, Takatsuki; Hiroo Tazaki, Nara, all of Japan

[73] Assignee: Sekisui Jushi Kabushiki Kaisha, Osaka, Japan

[21] Appl. No.: 848,089

[22] Filed: Apr. 4, 1986

[30] Foreign Application Priority Data

Apr. 4, 1985 [JP] Japan .................................. 60-71382
Apr. 4, 1985 [JP] Japan .................................. 60-71383

[51] Int. Cl.4 ........................... H04Q 7/00; H04B 9/00
[52] U.S. Cl. ........................ 340/825.540; 340/825.720; 340/825.350; 340/825.490; 455/607
[58] Field of Search ...................... 340/825.54, 825.35, 340/825.49, 825.3, 825.31, 568, 825.72, 825.44; 342/42, 44, 45; 455/343, 607

[56] References Cited

U.S. PATENT DOCUMENTS

| | | | |
|---|---|---|---|
| 4,194,201 | 3/1980 | Stein | 342/45 |
| 4,376,936 | 3/1983 | Kott | 340/825.3 |
| 4,635,053 | 1/1987 | Banks et al. | 340/825.31 |
| 4,636,950 | 1/1987 | Caswell et al. | 340/825.49 |
| 4,649,385 | 3/1987 | Aires et al. | 340/825.49 |
| 4,656,463 | 4/1987 | Anders et al. | 340/825.54 |
| 4,661,806 | 4/1987 | Peters et al. | 340/568 |

Primary Examiner—Donald J. Yusko
Attorney, Agent, or Firm—Armstrong, Nikaido, Marmelstein & Kubovcik

[57] ABSTRACT

An inquiry system is provided for detecting the location of a selected object. The system comprises an answering device having its own identifying address which responds to a detecting command. An answering device is provided on each object to be selected. The detecting command is transmitted from a controller device which communicates with the answering devices through the use of an address.

16 Claims, 19 Drawing Sheets

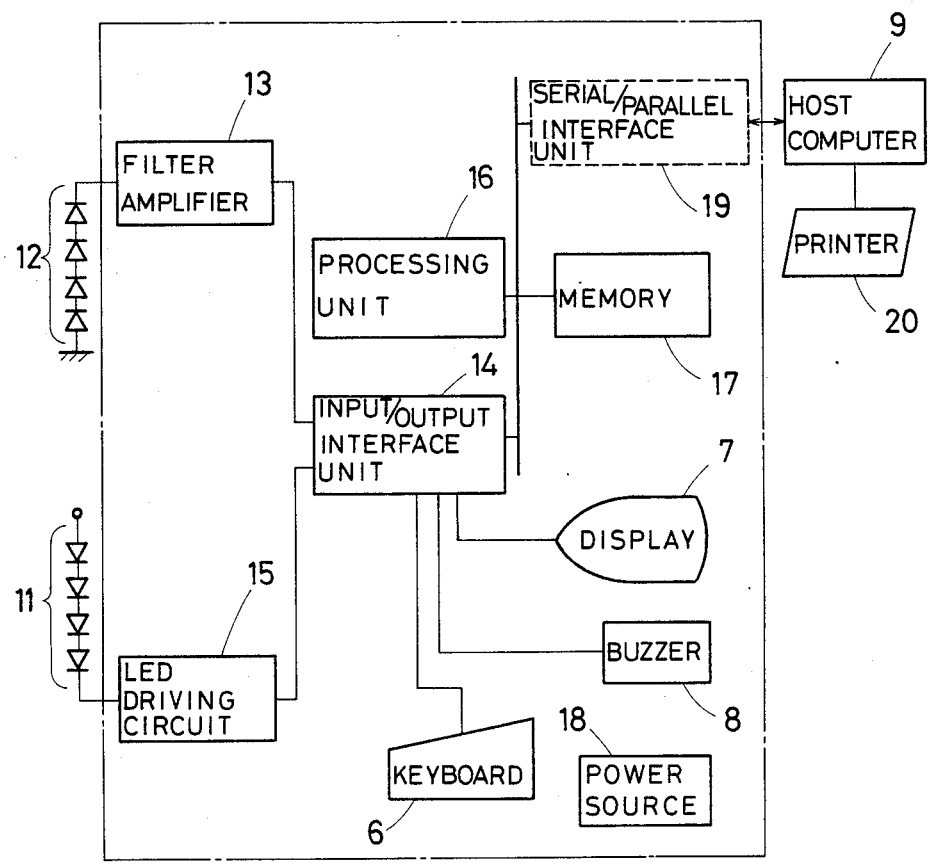
F I G. 2

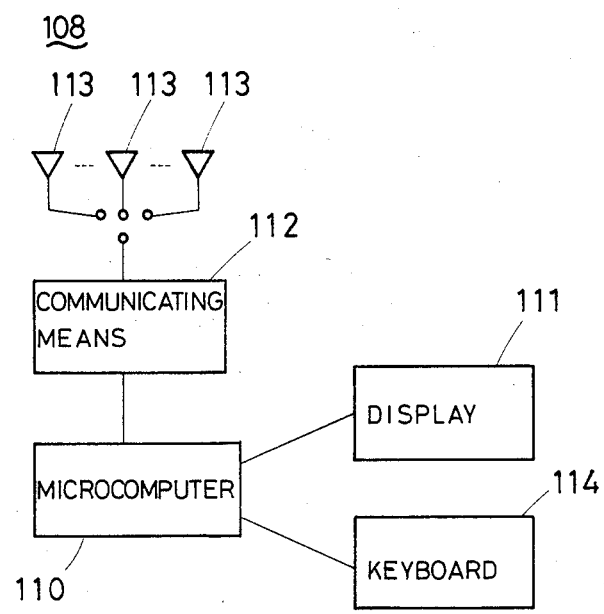
F I G. 17

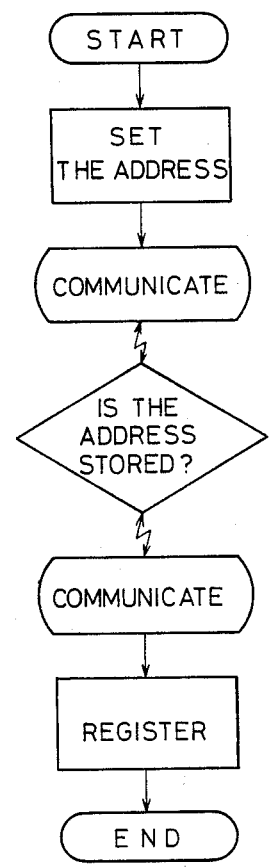
F I G. 18

4,814,742

INQUIRY SYSTEM FOR DETECTING A SELECTED OBJECT

BACKGROUND OF THE INVENTION

The present invention relates to an inquiry system for detecting the location of the selected object or article, and more particularly, to a system used in a parts case or a file case including many boxes or compartments in which different articles are contained. Further, the device may be used for locating a missing child.

With the increasing amount of machine parts or document files, the need for an inquiry system for detecting a desired object, has increased. Until now, in known parts cases used in a stock room, a plurality of boxes accommodate many articles, and the different articles are respectively assigned to a predetermined position having a plate number or an indecated name therefor. Thus, detection can be performed only by searching for the plate number or the name itself and it takes a considerable amount of time to complete the detecting of many desired parts. Further, in the file cases which contain many thin files, such as drawings, care must be taken to replace the files to their predetermined positions. To facilitate this annoying procedure, files are usually accompanied with identifying numbers or are distinguished from one another by colors. Moreover, a device for searching for missing persons in a crowded or large area has not yet been developed.

SUMMARY OF THE INVENTION

The present invention is directed to solving the problems pointed out with respect to the above prior art, and has for its object to provide an inquiry system for responding to a detecting command using bidirectional communication.

Another object of the present invention is to provide an inquiry system capable of precisely managing a entire stock of articles.

A further object of the present invention is to provide an inquiry system capable of searching for a missing person in a crowded or large area.

According to the present invention there is provided an inquiry system for detecting a desired object comprising an answering device having its own identified address for responding to a detecting command, an answering device being provided on each object to be selected. The detecting command is transmitted from a controller device which communicates with the answering device through the use of the address.

BRIEF DESCRIPTION OF THE DRAWINGS

FIG. 2 is a block diagram of a preferred embodiment of a controller device according to the present invention.

FIG. 17 is a block diagram of the controller used in the searching system for a missing child according to the present invention.

FIG. 18 is a flow chart of the program for the address determination procedure between the controller and the answering units according to an embodiment of the present invention.

DETAILED DESCRIPTION OF THE PREFERRED EMBODIMENT

Figure 1:
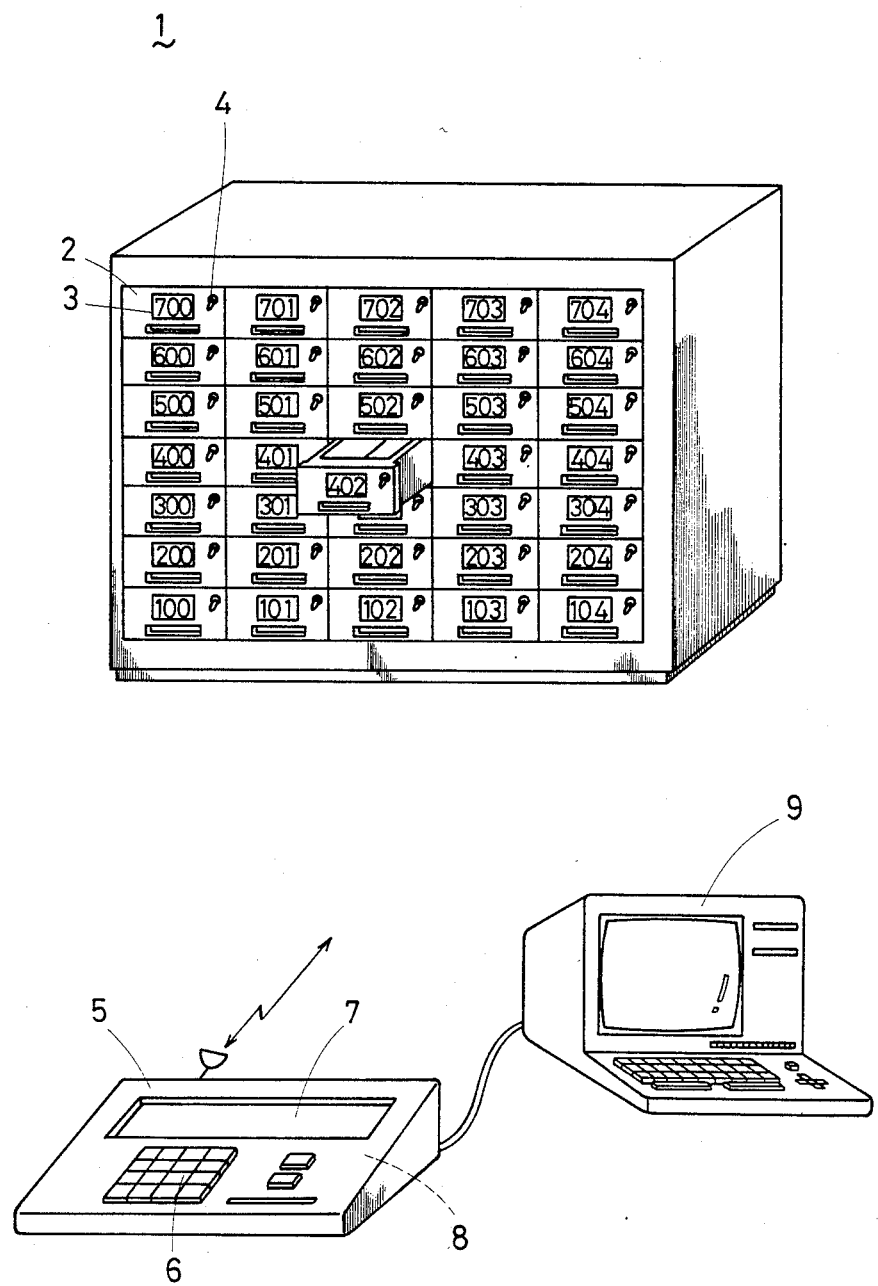
FIG. 1 is a perspective view of a parts case having answering units mounted thereon, a transmitter, and a host computer according to the present invention.

FIG. 1 shows a schematic illustration of an apparatus constructed in accordance with the present invention. Referring to FIG. 1, a parts case 1 is composed of a plurality boxes 2 accommodating stock parts. An answering unit having an automatic response system built-in, is deposited in each box. An automatic response system informs a selector or a picker of the position instructed by an inquiry device 5 and transmits information on the operating states or stock quantity. The answering unit is a device capable of communicating by an optical signal, and comprises a microcomputer having a battery as a power source. the box 2 has a number plate composed of light emitting diodes (LED) 3 and an acknowledge switch 4 for sending an answer back signal after the completion of picking procedures and also for switching off the LED 3. The inquiry device 5 comprises a keyboard 6 for selecting the answering unit belonging to a desired article, a LCD display 7 and a buzzer 8. The inquiry device 5 communicates with all of the answering units. The keyboard 6 is a hexadecimal keyboard which permits a predetermined address number of a desired article to be selected. The display 7 shows the content and type using the keyboard 6 and the answer back code transmitted by the answering unit. The buzzer 8 assists the display 7, especially by announcing an answering unit failure. Further, the device 5 is connected to a host computer 9 for sending an external code to select a specific answering unit and processing the accumulated data.

FIG. 2 is an overall block diagram of the device 5. As illustrated, the device 5 includes a transmitter portion having an infra-red LED 11 at high power and a receiver portion having sensitive photo diodes 12. The received serial data is applied to an input/output interface unit 14 through a filter amplifier 13 and is fed to the data bus by commands from a processing unit 16. The interface unit 14 controls an LED driving circuit 15. The host computer 9 is connected to a printer 20 for recording the results of the computation. The device 5 includes a memory 17 having a ROM and RAM, a power source 18, and a serial/parallel interface unit 19.

Figure 3:
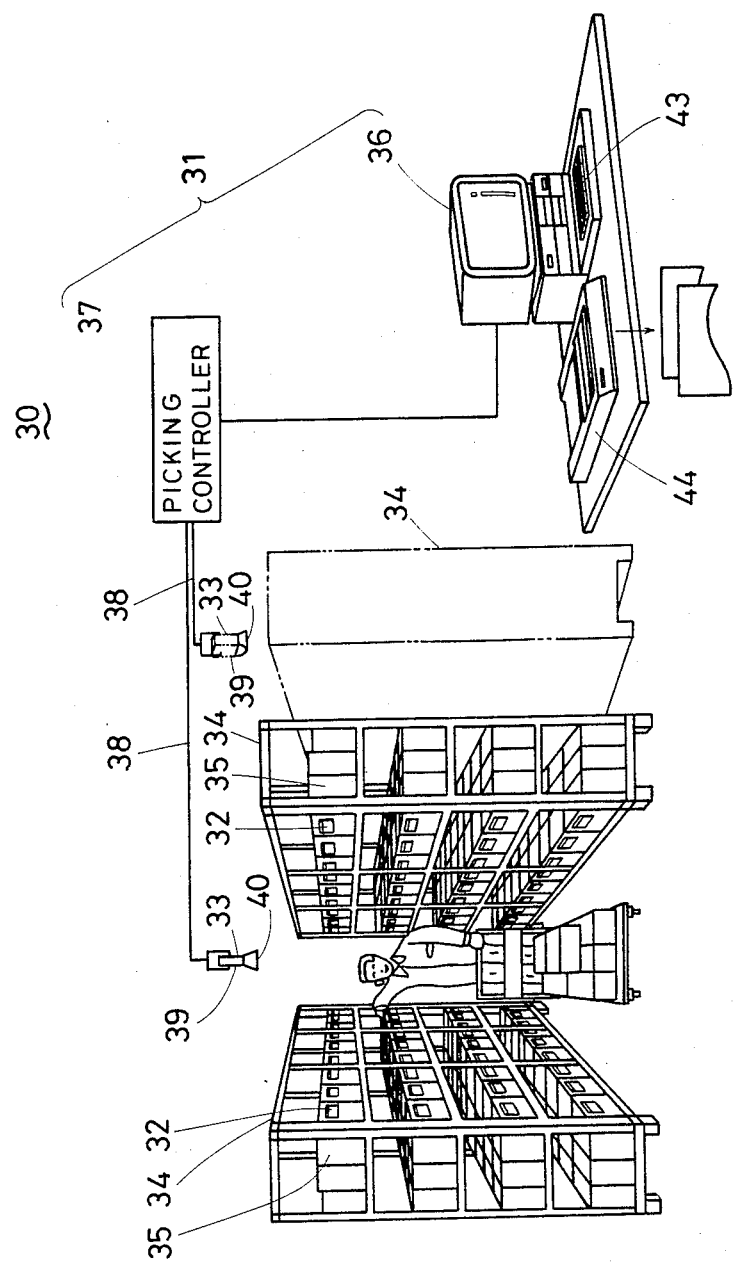
FIG. 3 is a perspective view showing an inquiry system including a relay unit embodying the present invention.

FIG. 3 further shows an example in which the inquiry device 5 is divided into two parts, a picking controller 37 and a relay unit 33 connected through an optical fiber 38. A parts rack 34 having multistaged boxes 35 is arranged as shown. The controller 37 decodes the data transferred from a host computer 36 and sends the decoded data to all relay units 33 through the optical fiber 38. Further, the controller 37 converts the answer back signal from the answering unit 32 through the relay unit 33 into serial data and transfers it to the host computer 36. The relay unit 33 is equivalent to a bidirectional antenna which communicates between the controller 37 and answering units 32. The relay unit 33 converts serial data and a photo-modulated signal reciprocally, transmitting the signal to the answering units 32, and further, receives the answer signal therefrom.

Figure 4:
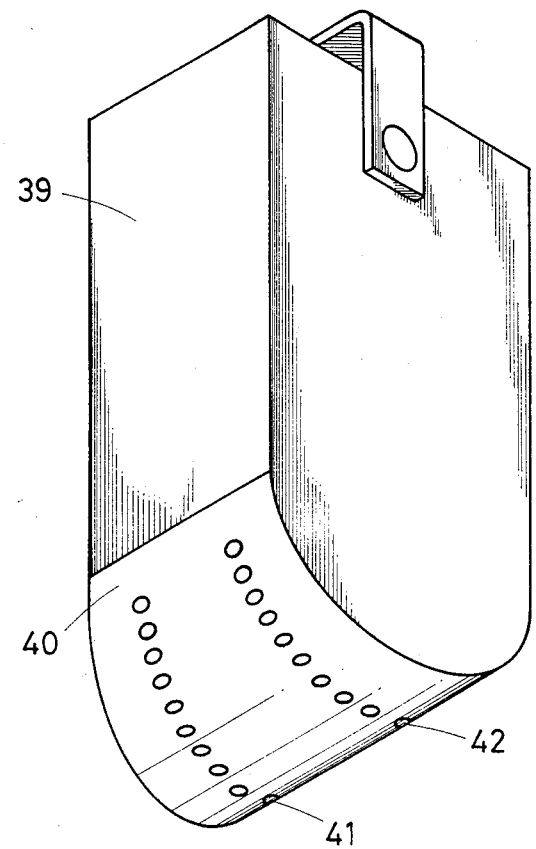
FIG. 4 is a perspective view of the relay units shown in FIG. 3.

FIG. 4 shows a schematic illustration of the relay unit 33. The unit 33 is formed with a main portion 39 and a communication means 40 which is widened towards the lower end. The lower end is provided with high power, infra-red light emitting diodes (LED) 41 and sensitive photo diodes 42. The diodes 41,42 produce a limited communication area along parallel arcs of a circle. Therefore, when the relay units 33 are set within the intervals of the communication area (on the roof of the aisle, for example), the relay units 33 can communicate with all answering units 32. The host computer 36 is provided with a printer 44 and an operating keyboard 43 for inputting an address and sending an external code to select a specific unit and for processing answer back data in the form of a stock number, a quality or a personal control signal.

Figure 5:
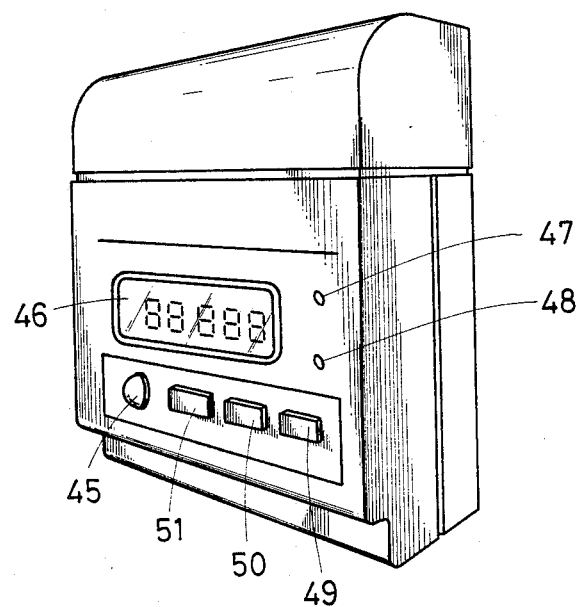
FIG. 5 is a perspective view of the answering unit shown in FIG. 3.

FIG. 5 shows a schematic illustration of the answering unit 32. The answering unit 32 receives and demodulates the photo-modulated signal, detects the commanded information, replies to the input information of the several keys 47–51 or the internal conditions such as the battey condition of the answering units 32. An LED 45 is lit for instructing a picker. The identifying address numbers are assigned to each answering unit 32 by means of an initializer (not illustrated), which sets different address numbers thereto; preferably the address numbers are initialized by the transmitted signal. The illustrated answering unit 32 is provided with five keys, a reset key 47, an initial key 48, a cancel key 49, an addrres key 50, and an answer key 51. The reset key 47 is used to initiate the memory. When the reset key 47 is switched, the power supply for a filter amplifier 59 (referring to FIG. 7) is cutoff and the display 46 shows six hyphens indicating the undetermined condition of the address number. The initial key 48 is used to initiate the unit sequence. When the initial key 48 is switched on, all flags are reset and the power is fed to the filter amplifier 59. The cancel key 49 is used to report a shortage in the quantity of the article to be picked. The address key 50 is used to show on a display 46 the address number, battery modes and flags. The answer key 51 for extinguishing the LED 45 is switched on when the commanded picking procedure is finished. A five digit display 46 shows the numerical data (the quantity of parts to be picked, for example), the address number and the working modes. The numerical data is displayed when the flag sets according to the transmitted data and the address number continues to be dispalyed during the operation of the address key 50.

Figure 6:
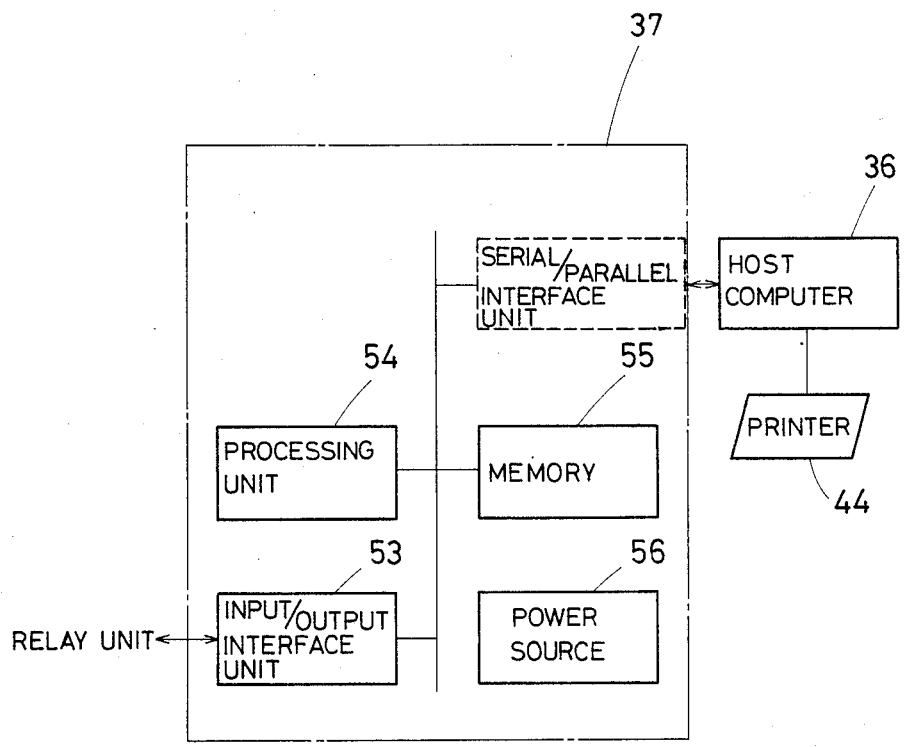
FIG. 6 is a block diagram of a preferred embodiment of the transmitter disclosed in FIG. 3.

FIG. 6 is an overall block diagram of the picking controller 37. The signal from the answering unit 32 is applied to an input/output interface unit 53 through the relay unit 33, fed to the host computer 36 according to the instructions of a processing unit 54 through a serial/parallel interface unit. On the other hand, the inquiry information generated by the host computer 36 is reversely transferred to the relay units 33. In FIG. 6, 55 denotes a memory having a ROM and RAM area, and 56 denotes a power source.

Figure 7:
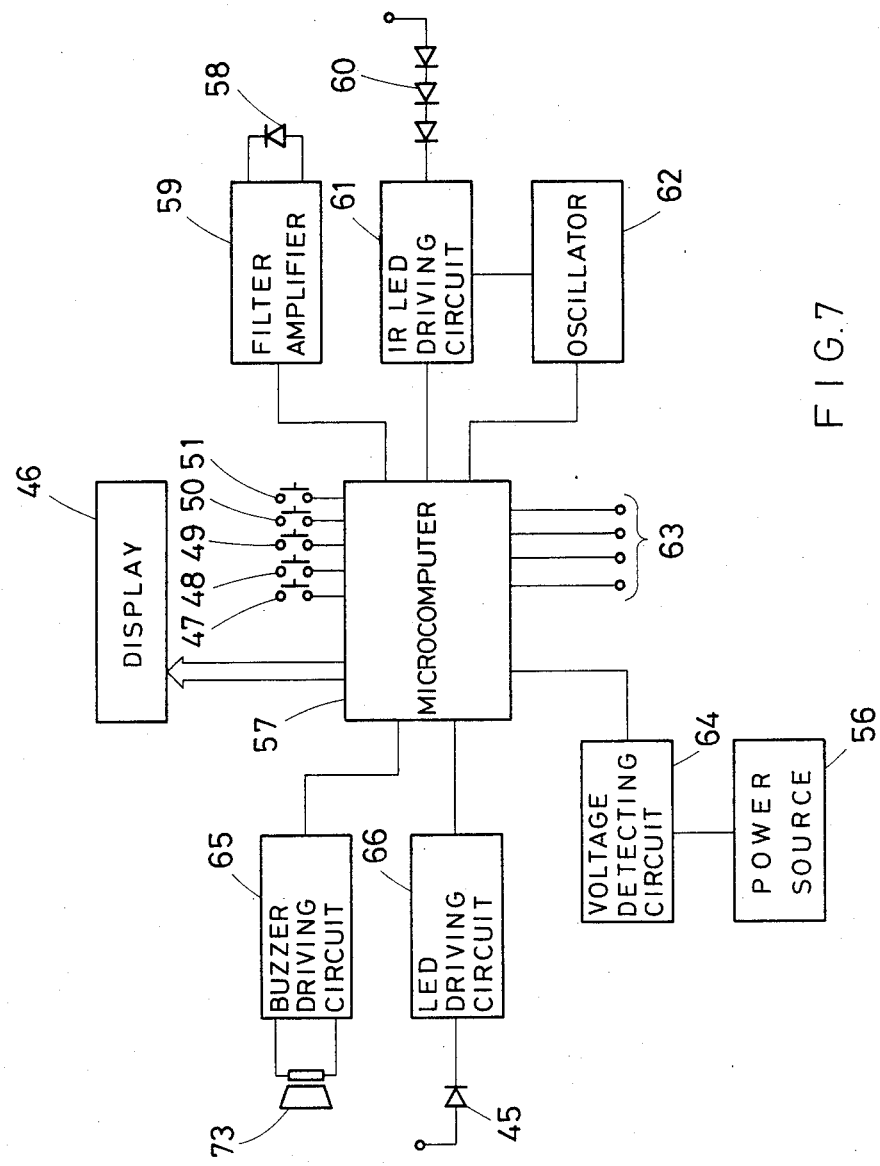
FIG. 7 is a block diagram of a preferred embodiment of the answering unit disclosed in FIG. 3.

FIG. 7 is a block diagram of the answering unit 32. A microcomputer 57 is provided with various interface circuits which control the answering unit 32. The interface circuits include, as illustrated, the LCD diaplay 46, a buzzer 73 for announcing the position to be picked, the LED 45, and the keys 47–51.

The receiver portion of the answering unit 32 includes photo diodes 58 and a filter amplifier 59 and the transmitter portion includes infra-red LED 60, a driving circuit 61 for supplying the current thereto and an oscillator 62 for use in modulating. The microcomputer 57 is provided with 4 bit external terminals which are used to feed the information, e.g., a remaining quantity in the box 35 detected by means of a weight sensor, or security data detected by means of a burglar sensor. the level down of the power voltage detected by a voltage detecting circuit 64 is applied to the microcomputer 57, to thereby show abnormal voltage conditions on the display 46 to indicate the necessity for changing the battery. In FIG. 7, 65 and 66 denote respectively a driving circuit for supplying the current to the buzzer 58 and the LED 45.

Figure 8:
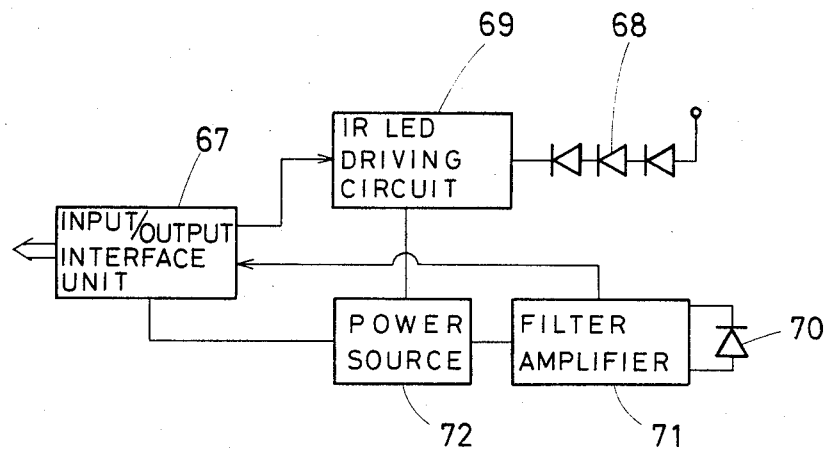
FIG. 8 is a block diagram of a preferred embodiment of the relay unit disclosed in FIG. 3.

FIG. 8 is an overall block diagram of the relay unit 33. The relay unit 33 communicates with the controller 37 through wire or wireless, and preferably through optical fibers. An input/output interface unit 67 is connected to the controller 37. The transmitter portion includes an infra-red LED 68 and a driving circuit 69 therefor, and the receiver portion of the relay unit 33 includes photo diodes 70 for sensing the light transmitted from the answering unit 32, and a filter amplifier 71 for separating the noise components in the light. A power source 72 is provided separately; but preferably the power source is supplied from the controller 37.

Figure 9:
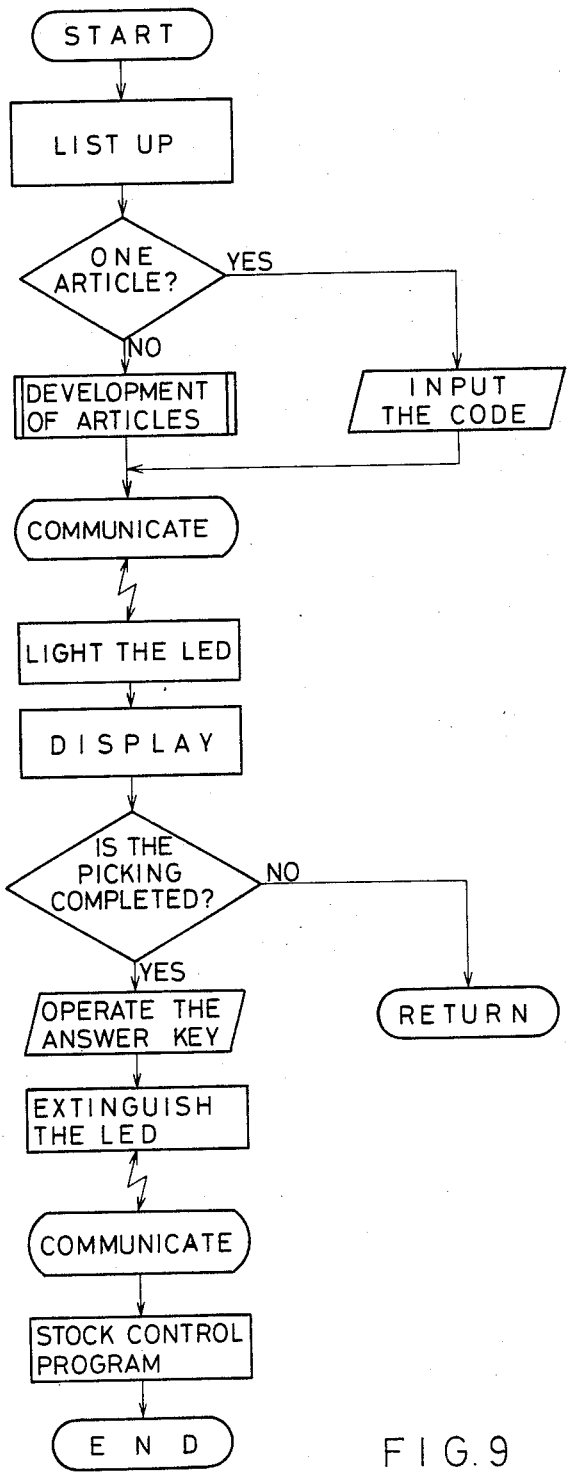
FIG. 9 is a flow chart of the program for a picking or selecting procedure according to an embodiment of the present invention.

Referring to FIG. 9, the picking procedure will be described in the case of the present exemplary embodiment. In the sequence, if the name of the goods or articles is provided, the host computer 36 can select the articles. At the beginning, an operator provides a name of goods or articles, and the host computer 36 determines whether it is the name of the goods or not. If the name of the goods is proper, the host computer 36 develops predetermined articles from the name according to a predetermined program, and sends the codes of the articles to the controller 37. The coded signal is sent to all answering units 32 through the relay units 33. In response to the signal, the LED 45 of the corresponding answering unit 32 is lit to instruct the picker as to the picking position. Further the quantity of the articles to be picked is shown on the display 46. The picker finds the lights of the LED 45, thereby picking up the determined articles. After the completion of each picking, the answer key 51 is operated and the LED 45 is extinguished. Further the answer back signal is transmitted to the controller 37 through the relay unit 33. The controller 37 transfers the signal to the host computer 36, wherein the host computer 36 confirms the completion of the picking procedure and sets the data available in a stock control.

Figure 10:
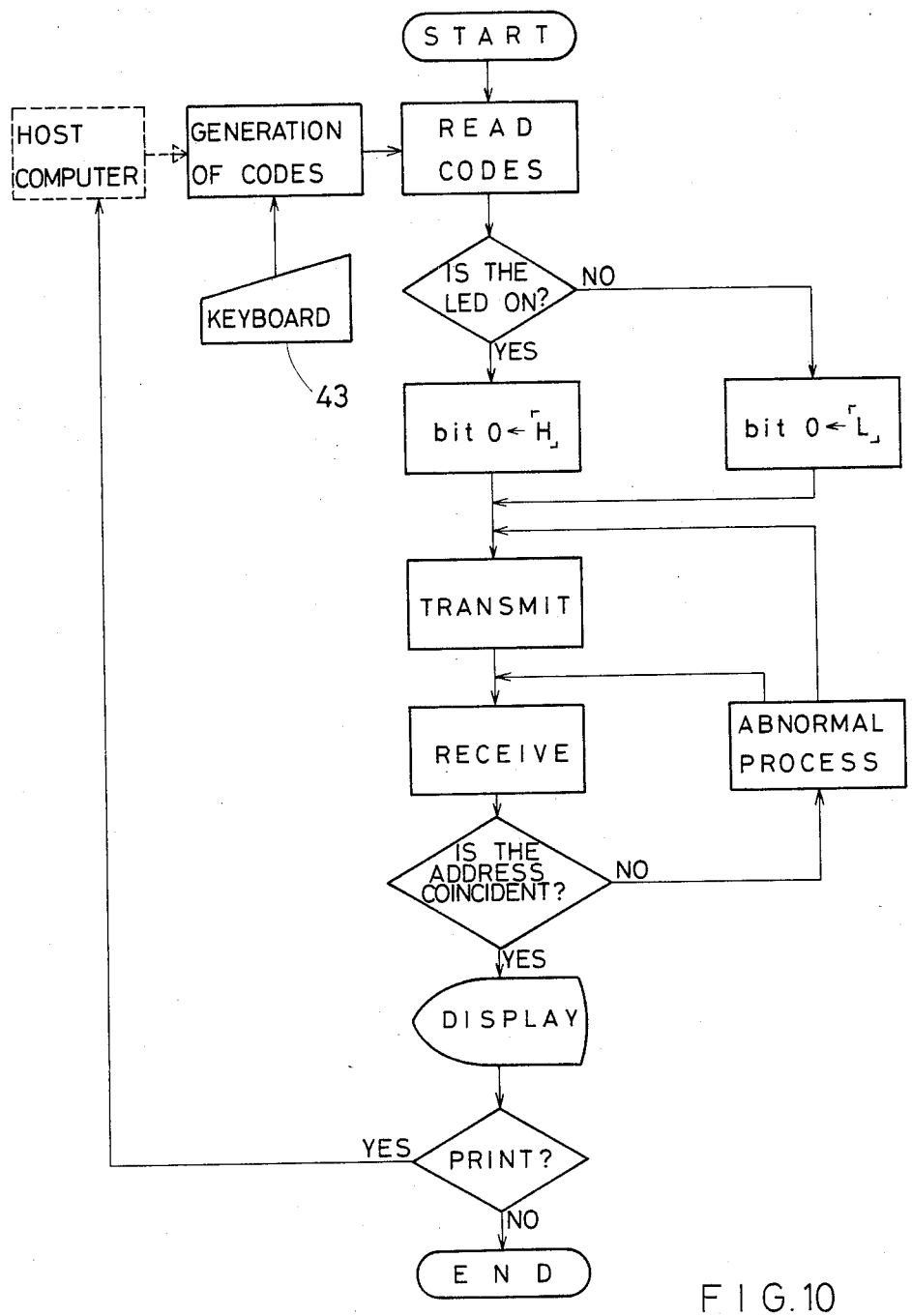
FIG. 10 is a flow chart of the program for the transmitting procedure of the transmitter according to an embodiment of the present invention.

Referring to FIG. 10, a description will be made of the operating procedure of the controller 37. At the beginning, an operator inputs the selection codes composed of the address number and several control codes corresponding to a desired article to be picked. The codes are decoded and stored in the memory, so that an instruction code contained in the control codes for lighting the LED 45 is found and the bit 0 of the serial data to be transmitted is set. On the other hand, if the instruction code is not included in the control code, the bit 0 is reset. Subsequently, the serial data processing bit 0 is transferred to the controller 37 and modulated therein. The modulated signal is then transmitted to the answering unit 32.

In response to the signal, the LED 45 of the corresponding unit 32 is lit to instruct the picker in the picking position. When the picker switches on the answer key 51 after the completion of the picking, the answer back signal is transmitted to the controller 37 through the relay unit 33.

The controller 37 receives the answer back signal, and compares the address number contained therein with the stored number. The results of the comparison are transferred to the host computer 36 and are displayed. If the wrong address is transmitted, the controller 37 performs a predetermined program, e.g., transmits again or maintains a stand-by condition capable of receiving.

Figure 11:
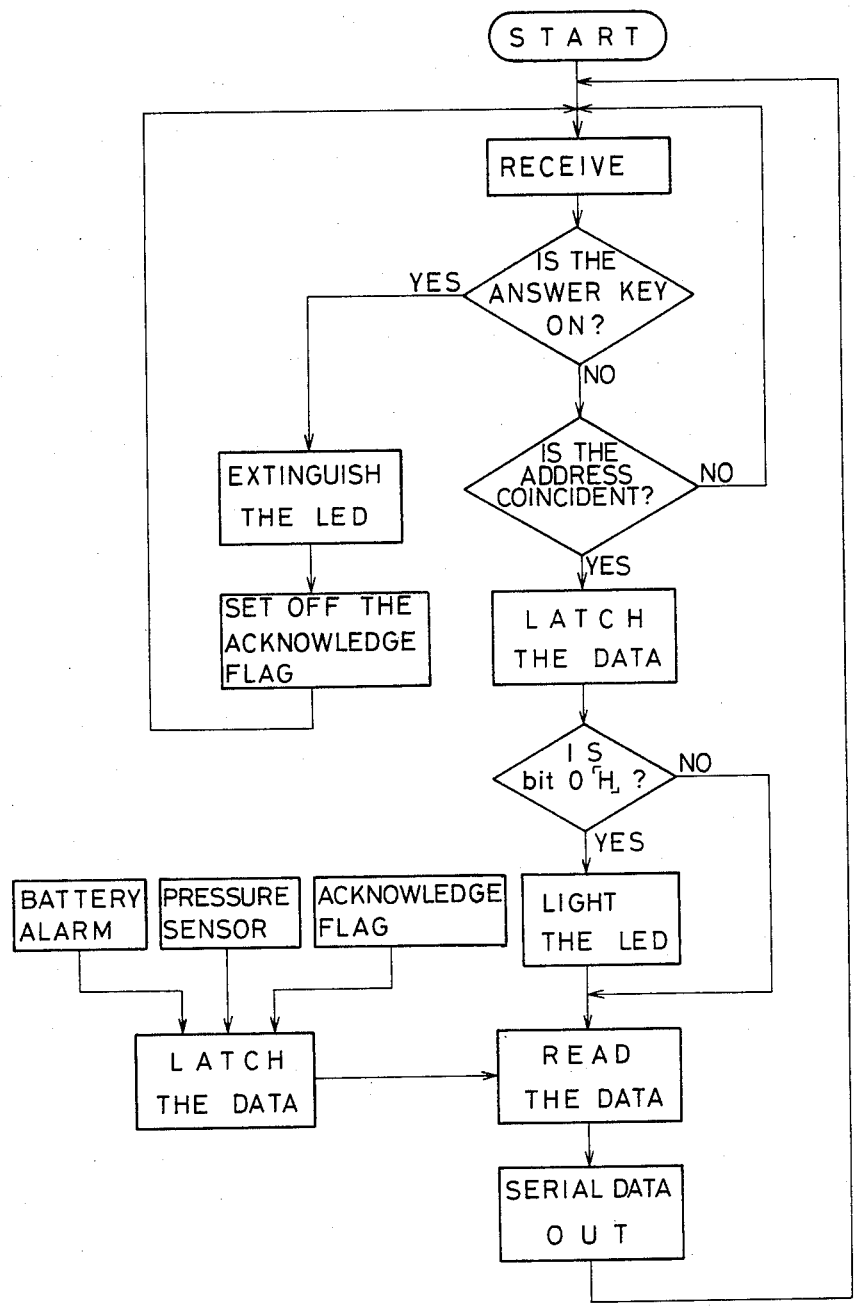
FIG. 11 is a flow chart of the program for the answering procedure of the answering unit according to an embodiment of the present invention.

Referring to FIG. 11, a description will be made of the operating procedure of the answering unit 32. The answering unit 32 receives an optical signal from the relay unit 33, so that the microcomputer 57 examines the condition of the answer key 51. If the answer key 51 is already switched on, the LED 45 is extinguished and an acknowledge flag is reset. If answer key 51 is off, the comparison between the transmitted address number and the assigned number is activated. When the comparison results in coincidence, the microcomputer 57 controls the driving circuit 66 according to the bit 0, contained in the serial data, whereby the picker can acknowledge the light of the LED 45. The addressed answering unit 32 generates the answer back optical signal comprised of the serial data as transmitted and accompanied by three acknowledge flags, which indicate the state of a battery alarm, the answer key 51, and a pressure sensor for measuring the remaining weight. This signal is transmitted to the controller 37 through the relay unit 33.

The controller 37 transfers the signal to the host computer 36. The computer 36 confirms the answer back signal and accumulates the information acquired by processing the data indicated by the flags. The information includes the battery conditions and the total stock acquired by dividing the sensed total pressure by the unit pressure.

In FIG. 11, a liquid level detection is available when adapting the system as an inquiry system for medical bottles. In addition, the communication is not limited to optical communication as mentioned above. An ultrasonic or magnetic wave for example is also available.

Figure 12:
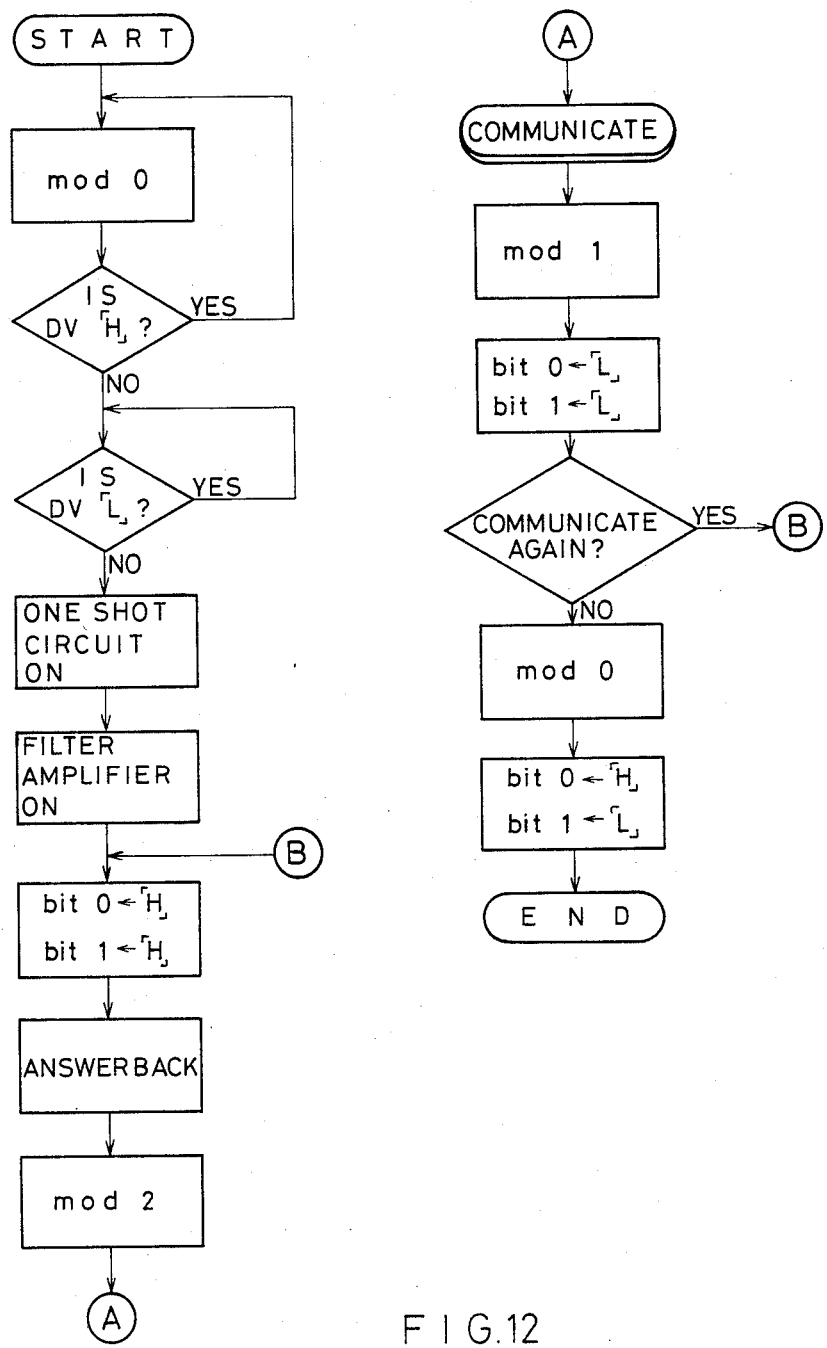
FIG. 12 is a flow chart of the program for the voltage mode change procedure of the answering unit.

Referring to FIG. 12, the operation for preserving the battery of the answering unit 32 will be described.

In the case of the present exemplary embodiment, the power source of the answering unit 32 is divided into three modes of operation having different operating ratios (practically called as duty ratios). A first mode (mod 0), having the operating ratio of 0.1 seconds per 10 minutes, is established in cases which are seldom recalled. A second mode (mod 1), having the operating ratio of 0.1 seconds per 2 seconds, is established in cases wherein it is easy to shift to other modes.

A third mode (mod 2), having the full ratio is established is usual communication. These three modes are identified through bit 0 and bit 1 contained in the particular digital codes of the answering unit 32:

mod 0 is bit 0=⌈H⌋ and bit 1=⌈L⌋;
mod 1 is bit 0=⌈L⌋ and bit 1=⌈L⌋;
mod 2 is bit 0=⌈H⌋ and bit 1=⌈H⌋.

As the initial conditions, mod 0 is assumed to be set. Once the control code transmitted for shifting modes is received, a flag DV (Data Valid) is reset. The answering unit 32 maintains mod 0 till the confirmation of the flag. The reset of control code sets the DV flag, so that the power of the battery is supplied to the filter amplifier 59. Further, the reset changes bit 0, bit 1 to ⌈H⌋ and answers back the ready condition for shifting to mod 2. Thereafter, the mode is established in mod 2 shift to usual communication. The procedure continues till the shifting of the units is completed or there is a misoperation. The address number of the misoperation unit is transferred to the host computer 36. From the foregoing, usual communication starts. On the other hand, once the picking procedure has ceased, mod 1 is set to all units 32. If communication is again desired, mod 2 is set, if otherwise mod 0 is set. The number of the mode is not limited to three as mentioned above, mod 1 may be preferably divided in more modes than one. Moreover, when the operating ratios shift continuously the lifetime of the battery is sustained much longer.

In relation to the example mentioned above, the present invention may be applied to an inquiry system used in a stock room. In this case, a moving device is equipped with an answering unit, e.g., a forklift truck and the same number plate as displayed thereon is respectively assigned to each stock block, whereby a worker on the truck performs picking procedures according to the contents on the display, so that the central control of many trucks can be performed effectively. Further, a worker may be equipped with the answering units.

Figure 13:
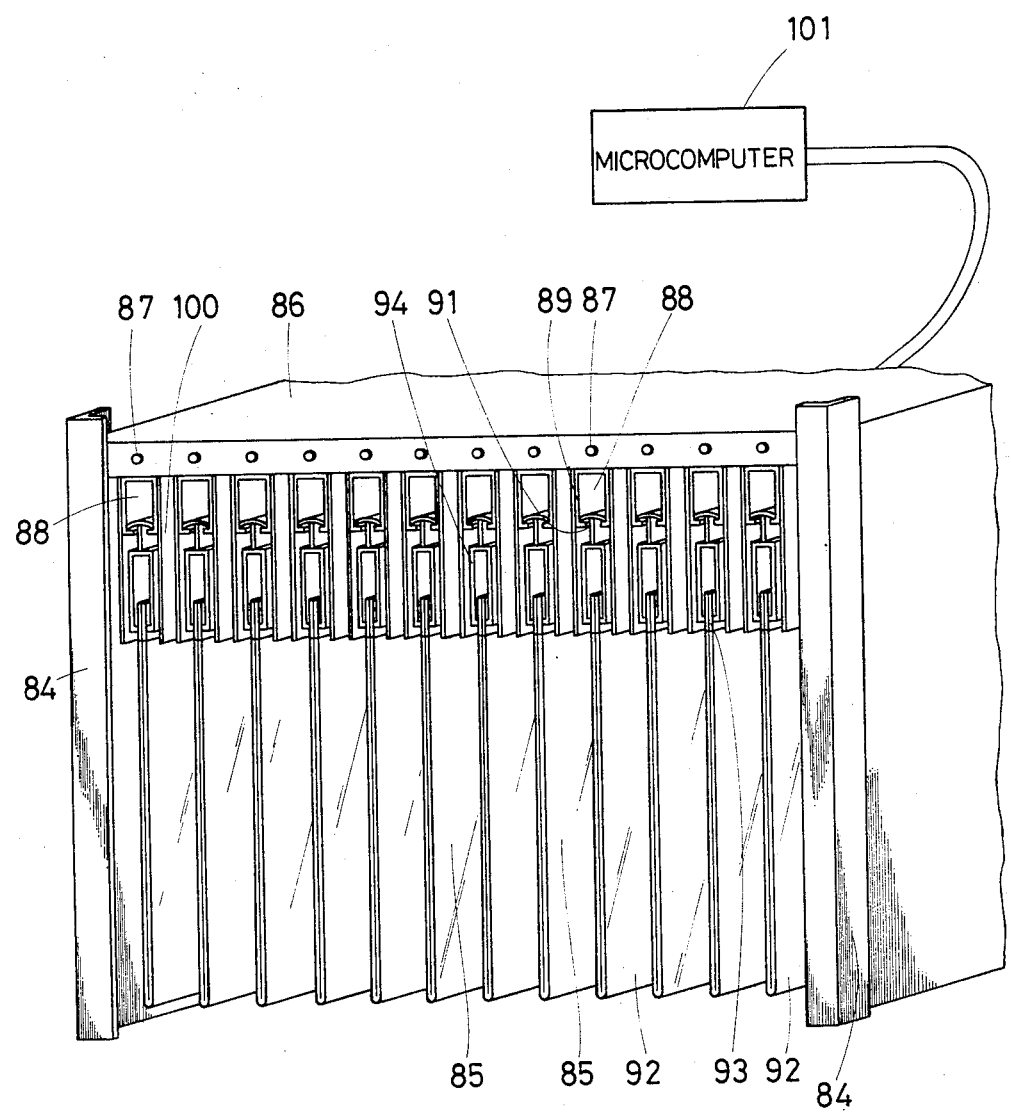
FIG. 13 is a perspective view of the detecting device in the file cases according to the present invention.
Figure 14:
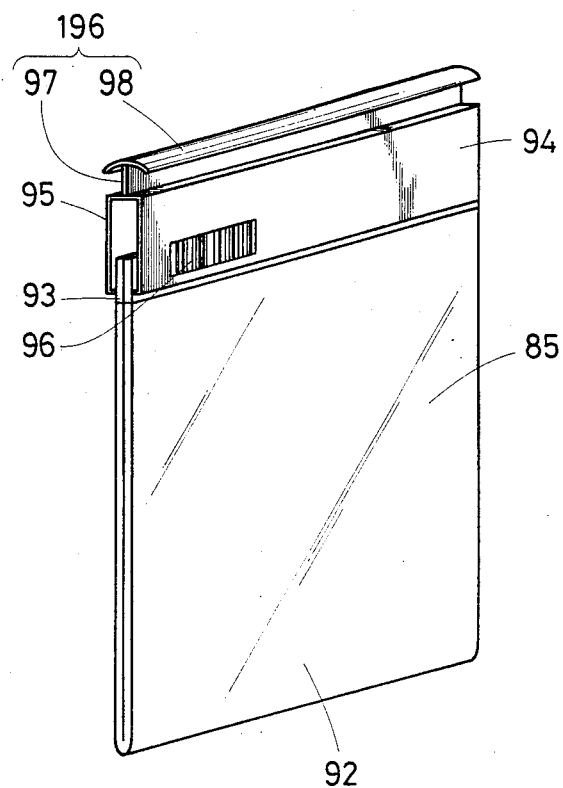
FIG. 14 is a perspective view of a preferred embodiment of the file disclosed in FIG. 13.
Figure 15:
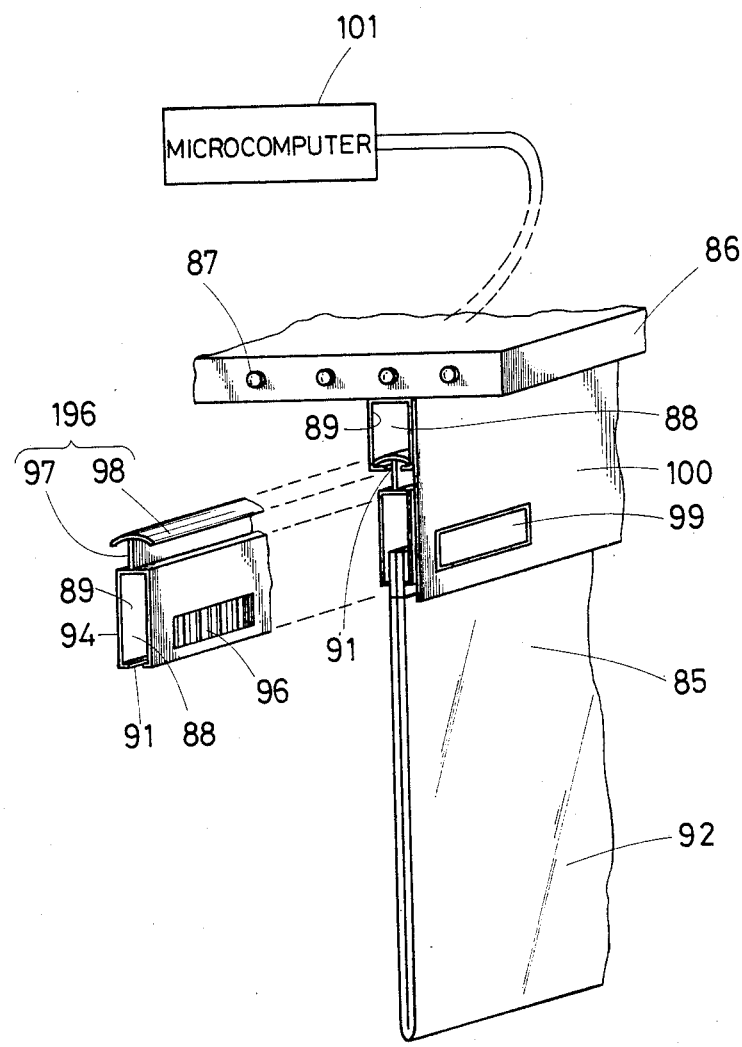
FIG. 15 is a perspective view of the file magnified in part.

Referring to FIGS. 13-15, a description will be made of another inquiry system applied to a file rack. A file rack 83 is used to hold many files 85 in a case 84. LEDs 87 are located at regular intervals on the front of the roof plate 86. The LEDs 87, for displaying searching information, are assinged to each store space 88. The store space 88 includes a stationary rail 89 formed like a hollow cylinder. A slit 91 is produced longitudinally along the under surface of the rail 89. The file 85, including a file body 92 and a check plate 93 provided thereon, is used to hold thin things, e.g., a paper or a drawing. a holding rail 94 made of synthetic resin, is integrated with a plug part 196 on a rail body 95, whereby rail 94 can slide on and engage the stationary rail 89. The plug part 196 includes a plate 97 standing longitudinally and a cover 98 extending therefrom. A bar code 96 is located on a side face of the rail body 95. The bar code 96 is positioned facing a bar code reader 99, when the file 85 is positioned in the store space 88. The bar code reader 99 is for example provided on a partition 100 between the store spaces. A microcomputer 101 is connected to the bar code readers and LEDs. In replacing the file 85, a person inserts the cover 98 in the stationary rail 89, inserting the plate 97 in the slit 91, thereby sliding the file 85 longitudinally. The microcomputer 101 includes a memory having a ROM and RAM, a central processing unit (CPU), and interfaces with the bar code reader 99 and the LED 87. The RAM stores both the position and the file name assigned thereto. The ROM stores a program used for searching. The microcomputer 101 is provided with a key unit (not illustrated) for keying the code of a file to be searched, and the LED 87 corresponding to the file is turned on.

When replacing the file 85, the bar code 96 is read through the bar code reader 99. The read code is fed to the microcomputer 101, wherein the file is returned according to predetermined procedures in accordance with the replacing position (address) and the identified code name. On the other hand, when picking up a desired file, the file name to be searched is provided. The microcomputer 101, receives the input data and begins to search for the address having the code name and the file position related thereto, and further lights an LED 87 in coincidence therewith. The operator can select the file by finding the light of the LED 87. If the desired file is already picked up, a display equipped with the microcomputer 101 messages "IN THE MIDST OF PICKING". The file 85 is used mainly for keeping thin materials, e.g., photoengraving, screen process printings, gravatures, or small articles. In this specification, the picking procedures, in general, are understood as including replacing procedures.

Figure 16:
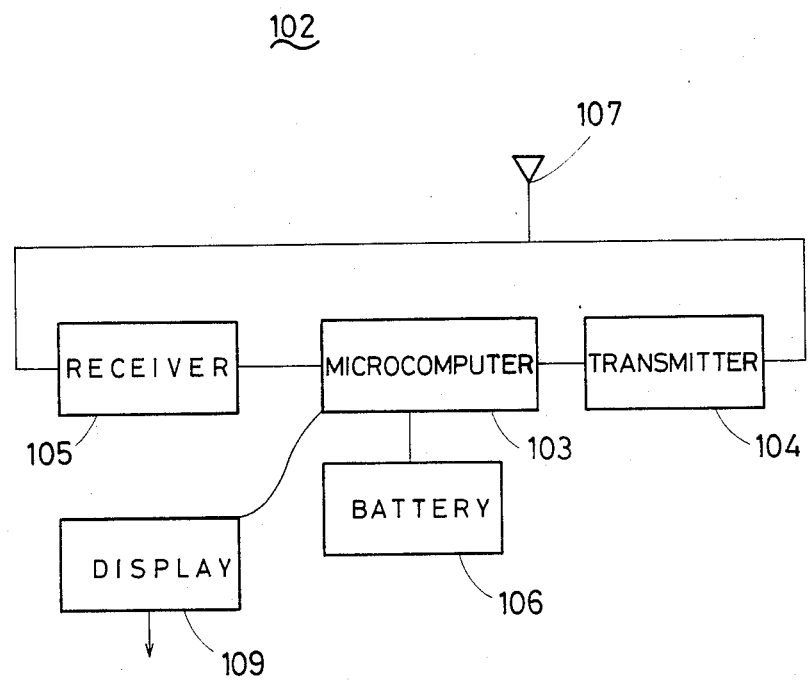
FIG. 16 is a block diagram of the answering unit used in a searching system for a missing child according to the present invention.

Referring to FIGS. 16–19, a description will be made of another inquiry system applied to a search for a missing person. FIG. 16 is an overall block diagram of the answering unit 102. An answering unit 102 is constructed as a miniature type which communicates bidirectionally with a controller 108. The answering unit 102 is provided with a microcomputer 103 connected to a transmitter 104 and a receiver 105. The power is supplied to the microcomputer 103 by a small battery 106 such as a lithium battery. An antenna 107 is provided for the transmitter 104 and the receiver 105. The answering unit 102 is associated with a person, especially a child. A display means 109 of the unit 102 is searched by a controller 108 shows the information by means of light or buzzer announcements.

FIG. 17 is an overall block diagram of the controller 108. The controller 108 includes a microcomputer 110 interfacing with a keyboard 114 and a display 111. The controller 108 inputs the address number of the answering unit to be searched and decodes the answer back signal. The controller 108 communicates with all answering units 102 through a communicating means 112. The communicating means 112 is connected to a relay unit 113 which functions as an antenna. The relay unit 113, located at regular intervals in the searching area, is connected to the other communication lines (optical fibers, for example). The communication between the relay units 113 and the communicating means 112 is not limited to hard wiring, optical or radio wave communication for example, is also available.

Referring to FIG. 18, a description will be made of an example of the initiating procedure for assigning an identified address number to each answering unit 102.

At the beginning, each answering unit is attached to a person, such as a child, at an entrance of a crowded or large area. An operator operates an input means to input an assigned address number according to the attached unit. The address number is transmitted to the corresponding answering unit 102, wherein the number is stored in a RAM. In response to the signal, the answering unit 102 transmits a signal indicating the completion of the initiating process to the controller 108. In return, the controller 108 registers the relationship between the address number and the unit 102. In addition to this procedure, the address number can be stored beforehand in a ROM.

Figure 19:
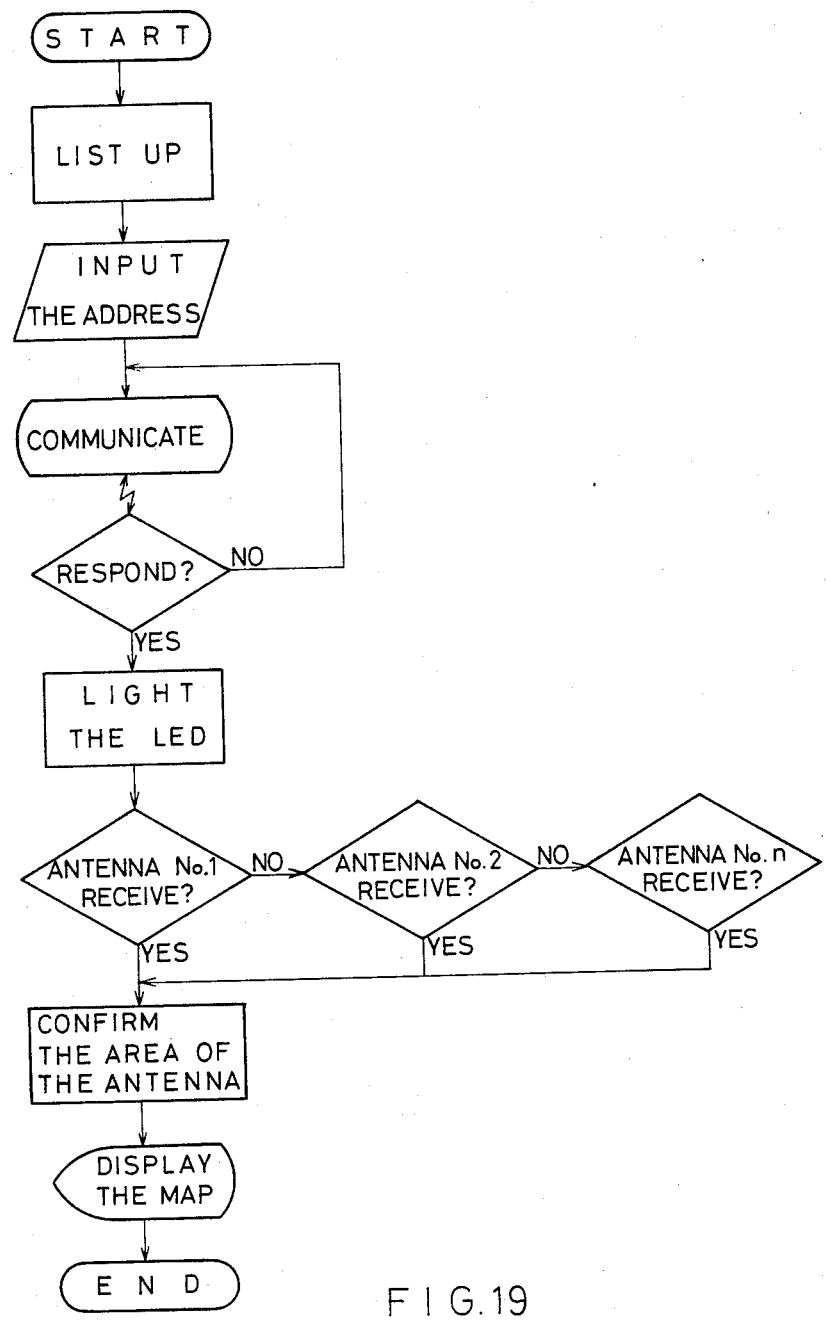
FIG. 19 is a flow chart of the program for the searching procedure according to an embodiment of the present invention.

Referring to FIG. 19, a description will be made of the procedure of searching for a missing child. The address number of a missing child is entered and is transmitted through relay units 113 in a searching area. The answering unit 102 in coincidence with the assigned number responds to the relay unit 113, and further, lights the display means 109. Subsequently, the controller 108 detects the responding relay unit, thereby confirming the detecting area of the relay unit 113 and displays the map of the area of the display 111. In this procedure, a missing child is located immediately. The answering unit 102 mentioned above is practically used in a limited area, e.g., a park, an amusement park, an air terminal building, a bathing beach, or a department store. In addition, this system is available for searching for a loitering old person. Further, when the controller 108 is constructed as a hand-held type, the system can be used for various shifting areas, such as sight-seeing places.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An inquiry system for detecting a selected object, said inquiry system comprising controller means for transmitting a command signal including an address signal indicating the object to be selected, and answering means located on the selected object, said answering means including detector means for detecting the command signal and indicator means for providing an answer signal when said detector means detects the command signal, said answering means further including a power supply and power supply operation control means, said power supply operation control means operating said power supply in at least three modes of operation, each mode of operation having a different ratio of on-time to off-time, wherein said power supply operation control means selects the mode of operation based upon the frequency of selection of said selected object.

2. An inquiry system as defined in claim 1, wherein said system further includes:
 a. an operating means coupled to said controller means for providing said controller means with the identifying address of the selected object; and
 b. a relay means coupled to said operating means for communicating between said answering means and said controller means.

3. An inquiry system for detecting a selected object as defined in claim 2, wherein said selected object is adapted to be attached to a person and wherein a plurality of said relay means are positioned at intervals in an area to be searched.

4. An inquiry system as defined in claim 2, wherein said relay means comprises:
   a. a converting means coupled to said operating means for converting the signal transferred from said operating means into an optical signal;
   b. a transmitting means coupled to said converting means for transmitting the signal to said answering means;
   c. a decoding means for decoding the optical signal transmitted by said answering means; and
   d. a transferring means coupled to the decoding means for transferring the decoded signal to said controller means.

5. An inquiry system as defined in claim 2, including optical fibers for connecting said operating means and relay means.

6. An inquiry system as defined in claim 1, wherein said system includes a host computer, said host computer comprising:
   a. an input means, coupled to said controller means, for applying a selection code consisting of the address of the object to be selected and control codes; and
   b. a control means for accumulating information transmitted by said answering means in the answer signal and for managing the total stock of the objects to be selected.

7. An inquiry system as defined in claim 1, wherein said answering means comprises:
   a. a decoding means for demodulating the transmitted signal from said controller means;
   b. a comparison means for identifying an address included in the command signal from said controller means and comparing the address with the identifying address; and
   c. a drive means for lighting a display means according to the results of the comparison.

8. An inquiry system as defined in claim 1, wherein said controller means sets the address of said answering means in said answering means.

9. An inquiry system as defined in claim 1, including a plurality of answering means each answering means being located on a different object to be selected and an initializer means wherein each said answering means is connected to said initializer means for setting a different identifying address in each of said answering means.

10. An inquiry system as defined in claim 1, including a plurality of answering means each answering means being located on a different object to be selected and wherein each said answering means is attached to a box for holding articles, and wherein each said answering means includes a sensing means for sensing the remaining quantity of articles in each box, and for transmitting the sensed value to said controller means.

11. An inquiry system as defined in claim 1, wherein said answering means comprises:
    a. a display means for responding to the signal transmitted from said controller means when the address included in the signal corresponds to the identifying address of said answering means; and
    b. an acknowledge means for informing said controller means of the completion of a response to the command signal.

12. An inquiry system as defined in claim 11, wherein said display means displays a quantity to be selected which is received from said controller means.

13. An inquiry system as defined in claim 11, wherein said display means displays abnormal battery conditions in said answering means.

14. An inquiry system as defined in claim 12, wherein said answering means is adapted to be applied to a moving device.

15. An inquiry system for detecting a selected object as defined in claim 1, wherein said power supply is a battery.

16. An inquiry system for detecting a selected object as defined in claim 15, wherein said controller means sets the address of said answering means in said answering means.

* * * * *